US008819448B2

(12) United States Patent
Frieder et al.

(10) Patent No.: US 8,819,448 B2
(45) Date of Patent: Aug. 26, 2014

(54) METHOD AND SYSTEM FOR MANAGING INFORMATION ON MOBILE DEVICES

(75) Inventors: Ophir Frieder, Chevy Chase, MD (US); Micah Sherr, Washington, DC (US); Jordan Wilberding, Fairfax, VA (US)

(73) Assignee: Georgetown University, Washington, DC (US)

(*) Notice: Subject to any disclaimer, the term of this patent is extended or adjusted under 35 U.S.C. 154(b) by 560 days.

(21) Appl. No.: 13/098,127

(22) Filed: Apr. 29, 2011

(65) Prior Publication Data

US 2012/0278633 A1 Nov. 1, 2012

(51) Int. Cl.
*G06F 12/14* (2006.01)
*H04L 9/00* (2006.01)

(52) U.S. Cl.
USPC ........... 713/189; 713/165; 713/171; 713/182; 726/26; 726/34; 726/35; 380/28; 380/30; 380/277; 380/278; 380/282

(58) Field of Classification Search
USPC .................. 713/189; 726/26, 34; 380/277
See application file for complete search history.

(56) References Cited

U.S. PATENT DOCUMENTS

| 7,007,068 | B2 | 2/2006 | Morkel | |
|---|---|---|---|---|
| 7,096,254 | B2 | 8/2006 | Awada et al. | |
| 8,201,263 | B2* | 6/2012 | Apelqvist | 726/30 |
| 2003/0126436 | A1* | 7/2003 | Greenberg et al. | 713/168 |
| 2005/0080746 | A1 | 4/2005 | Zhu et al. | |
| 2006/0095786 | A1* | 5/2006 | Aaron | 713/184 |
| 2007/0130470 | A1 | 6/2007 | Blom et al. | |
| 2008/0083026 | A1 | 4/2008 | Sent | |
| 2008/0288774 | A1* | 11/2008 | Mahdavi | 713/155 |
| 2009/0116643 | A1 | 5/2009 | Hatano et al. | |
| 2010/0050235 | A1* | 2/2010 | Hardie et al. | 726/3 |
| 2010/0235425 | A1* | 9/2010 | Holden et al. | 709/202 |
| 2012/0221470 | A1* | 8/2012 | Lyon | 705/44 |
| 2012/0290694 | A9* | 11/2012 | Marl et al. | 709/223 |

FOREIGN PATENT DOCUMENTS

WO WO2009/127239 10/2009

OTHER PUBLICATIONS

Gopal et al, 2008, IEEE, pp. 316-325.*
Van et al, Oct. 2007, vol. 37, No. 5, pp. 1237-1247.*
Eoghan Casey; Handbook of Computer Crime Investigation,Academic Press; pp. 4-5;2002.
Addison Wesley; Forensic Discovery Dan Farmer and Wietse Venema; pp. 147-148; 2005.
John Vacca et al. ; System Forensics, Investigation, and Response; Part 1 The System Forensics Landscape; 2011.

(Continued)

*Primary Examiner* — Christopher Brown
*Assistant Examiner* — Jenise Jackson
(74) *Attorney, Agent, or Firm* — Matthew K. Ryan; Brian M. McGuire; Frommer Lawrence & Haug LLP

(57) ABSTRACT

A system and method for protecting information on a mobile device. The method and apparatus obtain a predetermined portion of asymmetric information upon an input of the asymmetric information in the mobile device; generate an identifier by using a first generating algorithm that uses the predetermined portion of the asymmetric information as an algorithm input; generate an encryption key by using a second generating algorithm that uses the predetermined portion of the asymmetric information as an algorithm input; generate ciphered information by using an encryption algorithm that uses the encryption key and the information as algorithm inputs; associate the identifier with the ciphered information; and store the ciphered information as associated with the identifier.

13 Claims, 11 Drawing Sheets

(56) References Cited

OTHER PUBLICATIONS

Dan Farmer and Wietse Venema; Forensic Computer Analysis: An Introduction;http://drdobbs.com/184404242; pp. 1-11; Sep. 1, 2000.

Gary Palmer; A Road Map for Digital Forensic Research Report From the First Digital Forensic Research Workshop (DFRWS) Aug. 7-8, 2001 Utica, New York.

* cited by examiner

Figure 11

Contacts Full List

1357dd6177f967668c8a953d

662bceb1d24b0dbb9e071735

3b88c225e9c11d81e48dcdad c8da8e5384b862274a1bb731

32e0a815ec3c099a8f321c30 cb7d031a493099aae402ac56

991ba4203b9729c59ded8368

METHOD AND SYSTEM FOR MANAGING INFORMATION ON MOBILE DEVICES

DISCUSSION OF RELATED ART

Mobile devices, such as smart phones and personal digital assistants (PDA), have become more and more integrated with personal lives. As a result, mobile devices now store a great deal of sensitive or personal information such as contacts, bank accounts, credit card numbers, and medical records. It has been recognized that such sensitive or personal information needs to be protected from being accessed by an unauthorized party.

Conventional methods that protect information stored on a mobile device include using a password, encrypting the stored information, or a combination of both.

The conventional method of protecting information by a password typically requires a user to input just one password before using the mobile device or accessing the stored information. If a correct password is input, information stored in the mobile device is free to be accessed without further protection measures. A mobile device normally asks a user to set only a 4-digit password made of a mere combination of numbers. Passwords that have more digits or require other elements, such as symbols and characters, are rarely required for the sake of convenience and are still relatively insecure.

Another conventional method of protecting stored information encrypts the stored information by using an encryption key, for example, one based on a password. An encryption process converts plain text into cipher text so that the meaning of the plain text may not be revealed. Plain text refers to those text whose contents are discernable by a reader. For example, an exemplary sentence, which is deemed plain text, can include the characters "It was the best of times," whose meaning is understandable by a reader. When the above-shown sentence is encrypted, the encryption result, which is called cipher text, may have the following characters "A0293DA#M';ad)3DRk3Z$", which obfuscates the semantic meaning of the plaintext. To read the cipher text, a decryption process is required to convert cipher text to plain text by using a decryption key. Often, the decryption key is the same as the encryption key. If the encryption and/or decryption keys are generated by using a weak password, it is highly possible that an attacker who has access to the cipher text can guess the key and consequently learn the plain text.

SUMMARY

Password-based protection alone leaves the data vulnerable to password-guessing attacks. As mobile devices often have limited input interfaces, for example, a mobile device's keypad, such interfaces may only have limited options of numbers and characters, resulting in a weak password (e.g. usually 4 digits). An adversary who obtains the device's physical memory can, with the help of readily available hacking technologies, use brute-force methods to exhaust all possible passwords in a negligible amount of time and decipher all contact information on the device. For example, if the password has only 4 numeric digits, the attacker needs only to try at most $10^4=10,000$ possible passwords to identify the correct combination. Even if a user uses a 6-digit password, the attacker needs at most $10^6=1,000,000$ attempts to identify the correct combination. A computer, whose central processor unit may have its clock speed well above the gigahertz threshold, may attempt hundreds of thousands of passwords per second. Conceivably, it may only take fractions of a second for an attacker to identify the correct password of a mobile device through a trial-by-error process by using a computer.

Conventional methods for protecting sensitive information either protect the information using a simple password or an encryption key that is derived using a single password. In the latter case, an attacker can use a computer to try all possible passwords to find the correct encryption key. After that single encryption key is identified, all the information can be deciphered. Protecting all information with a single encryption key gives incentives to an attacker with the hope of knowing all the information by a single effort.

Disclosed are embodiments directed to systems, products, and methods for managing information stored on a mobile device.

One embodiment is directed to a method for protecting information on a mobile device. The method comprises: obtaining a predetermined portion of asymmetric information upon an input of the asymmetric information in the mobile device; generating an identifier by using a first generating algorithm that uses the predetermined portion of the asymmetric information as an algorithm input; generating an encryption key by using a second generating algorithm that uses the predetermined portion of the asymmetric information as an algorithm input; generating cipher text by using an encryption algorithm that uses the encryption key and the information as algorithm inputs; associating the identifier with the cipher text; and storing the cipher text as associated with the identifier.

According to another embodiment, the information includes contact information, and the predetermined portion includes a contact name of the contact information.

According to another embodiment, the method further comprises generating a first salt that is used as an algorithm input by the first generating algorithm and the second generating algorithm.

According to another embodiment, the first generating algorithm and the second generating algorithm are different.

According to another embodiment, the method further comprises generating a first salt and a second salt, wherein the first salt and the second salt are different.

According to another embodiment, the first generating algorithm uses the first salt as an algorithm input, and the second generating algorithm uses the second salt as an algorithm input. The first algorithm and the second algorithm are identical.

According to another embodiment, the first generating algorithm uses the first salt as an algorithm input, and the second generating algorithm uses the second salt as an algorithm input. The first algorithm and the second algorithm are different.

According to another embodiment, when a plurality of pieces of information are inputted into the mobile device, each piece of the input information is individually encrypted by using asymmetric information associated with that piece of the input information.

According to another embodiment, the method further retrieves information from the mobile device.

According to another embodiment, the method further comprises prompting a user to input retrieving information; generates search information by using the first generating algorithm; and determines whether the search information matches any identifier stored in the mobile device.

According to another embodiment, the method further comprises matching the search information to the identifier stored in the mobile device, and generates a decryption key by using the second generating algorithm, and decrypts information associated with the identifier by using the decryption key.

According to another embodiment, when the first generating algorithm and the second generating algorithm are identical, the first generating algorithm includes a first salt as an algorithm input, and the second generating algorithm includes a second salt as an algorithm input. The first salt and the second salt are different.

According to another embodiment, when the first generating algorithm and the second generating algorithm are different, the first generating algorithm and the second generates algorithm including a same salt as an algorithm input.

Another embodiment is directed to a non-transitory storage medium recorded thereon a program that, when executed, causes a processor to execute a method for protecting information, the method comprises: obtaining a predetermined portion of asymmetric information upon an input of the asymmetric information in the mobile device; generating an identifier by using a first generating algorithm that uses the predetermined portion of the asymmetric information as an algorithm input; generating an encryption key by using a second generating algorithm that uses the predetermined portion of the asymmetric information as an algorithm input; generating ciphered information by using an encryption algorithm that uses the encryption key and the information as algorithm inputs; associating the identifier with the ciphered information; and storing the ciphered information as associated with the identifier.

Another embodiment is directed to a mobile device that comprises a processor that implements an information protecting method, the method including: obtaining a predetermined portion of asymmetric information upon an input of the asymmetric information in the mobile device; generating an identifier by using a first generating algorithm that uses the predetermined portion of the asymmetric information as an algorithm input; generating an encryption key by using a second generating algorithm that uses the predetermined portion of the asymmetric information as an algorithm input; generating ciphered information by using an encryption algorithm that uses the encryption key and the information as algorithm inputs; associating the identifier with the ciphered information; and storing the ciphered information as associated with the identifier.

Another embodiment is directed to a system that implements an information protecting method, the information protecting method including: obtaining a predetermined portion of asymmetric information upon an input of the asymmetric information in the mobile device; generating an identifier by using a first generating algorithm that uses the predetermined portion of the asymmetric information as an algorithm input; generating an encryption key by using a second generating algorithm that uses the predetermined portion of the asymmetric information as an algorithm input; generating ciphered information by using an encryption algorithm that uses the encryption key and the information as algorithm inputs; associating the identifier with the ciphered information; and storing the ciphered information as associated with the identifier.

Other embodiments include the methods described above but implemented using a system, apparatus or programmed as computer code to be executed by one or more processors operating in conjunction with one or more electronic storage media.

BRIEF DESCRIPTION OF THE DRAWINGS

To the accomplishment of the foregoing and related ends, certain illustrative embodiments of the invention are described herein in connection with the following description and the annexed drawings. These embodiments are indicative, however, of but a few of the various ways in which the principles may be employed, and the present invention is intended to include all such aspects and their equivalents. Other advantages, embodiments and novel features may become apparent from the following description when considered in conjunction with the drawings. The following description, given by way of example, but not intended to limit the invention solely to the specific embodiments described, may best be understood in conjunction with the accompanying drawings, in which:

FIG. 11 illustrates an exemplary screen shot of a list of stored information according to an embodiment.

DETAILED DESCRIPTION

Figure 1:
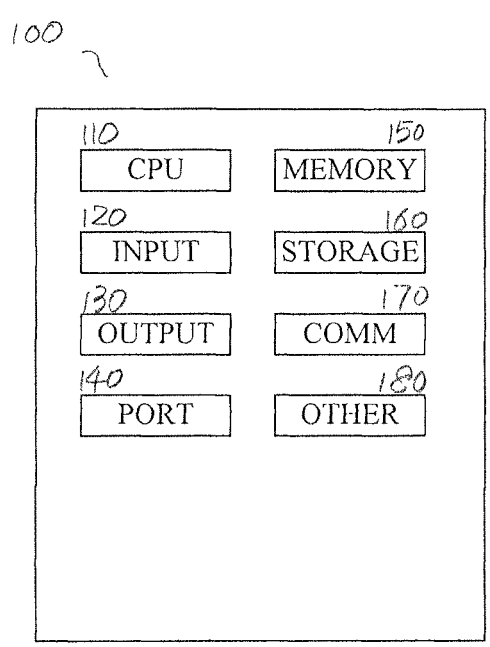
FIG. 1 illustrates a mobile device according to an embodiment.

It is noted that in this disclosure and particularly in the claims and/or paragraphs, terms such as "comprises," "comprised," "comprising," and the like can have the meaning attributed to it in U.S. patent law; that is, they can mean "includes," "included," "including," "including, but not limited to" and the like, and allow for elements not explicitly recited. Terms such as "consisting essentially of" and "consists essentially of" have the meaning ascribed to them in U.S. patent law; that is, they allow for elements not explicitly recited, but exclude elements that are found in the prior art or that affect a basic or novel characteristic. These and other embodiments are disclosed or are apparent from and encompassed by, the following description. As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Furthermore, the detailed description describes various embodiments for illustration purposes and embodiments include the methods described and may be implemented using one or more apparatus, such as processing apparatus coupled to electronic media. Embodiments may be stored on an electronic media (electronic memory, RAM, ROM, EEPROM) or programmed as computer code (e.g., source code, object code or any suitable programming language) to be executed by one or more processors operating in conjunction with one or more electronic storage media.

Embodiments may be implemented using one or more processing devices, or processing modules. The processing devices, or modules, may be coupled such that portions of the processing and/or data manipulation may be performed at one or more processing devices and shared or transmitted between a plurality of processing devices.

According to an embodiment, a method is presented to prevent an adversary from discerning asymmetric information such as contact information from a physically captured mobile device. The method withstands hacking attacks to obtain stored information (for example, ex-filtrating the memory of the mobile device), does not assume any network connectivity, and does not require a priori trust in any external system or component (i.e., it trusts only itself). The method offers stronger protections than the conventional password-protection schemes. In particular, the method (i) does not require users to memorize potentially weak passwords and (ii) protects each contact using independent cryptographic/encryption keys to ensure that the compromise of one contact does not leak the identities of the others. The method may be well-suited for settings in which devices that contain confidential information are subject to capture by an adversary with certain technological capabilities.

In the embodiments disclosed hereby, asymmetric information includes information that an authorized user of a device would know or be expected to know, whereas an unauthorized person or adversary would not.

In the embodiments disclosed hereby the security of the method uses the asymmetry between the device's authorized user and an attacker. The former knows, to a certain degree, information included in the mobile device, such as contacts' names, whereas the latter does not. The method leverages this asymmetry by encrypting contact information using asymmetric information inherent to stored information such as the contacts' names. After encryption, the ciphered text, such as names and contacts, are stored. Since the method does not store the contacts' names in plain text on the device, an adversary who captures the device (and who lacks the requisite knowledge of the asymmetric information such as contacts' names) can neither enumerate the contacts nor decrypt their information. Although an attacker may guess or obtain sensitive information as to one or a few names, or use a list of pre-selected names for an attack, the effectiveness of such an attack is substantially reduced. This is because, as shown below for each record, an attacker must spend vast resources and time to guess the asymmetric information even where, for example, the attacker knows the protection algorithm. Moreover, even if the attacker is successful in one or a few names, all other contacts remain protected, as knowledge of a single name only works with a single contact.

According to an embodiment, asymmetric information is decided herein in terms of a contact. However, other forms of asymmetric information, such as a file name of individualized files, could be used. Each entry of contact on the mobile device is separately encrypted and tagged with a cryptographic hash of the contact's name. For example, a phone may maintain a database of records each of which contains three fields: salt, digest, and encrypted contact information. The "salt" is a short randomly generated string that differs with each entry. The usage of salt increases the difficulty for an attacker to break the protection. The digest is computed using a cryptographic hash of the contact's name combined with the salt. The digest may be used as an identifier for a record. The encrypted contact information is obtained by encrypting all information relating to the contact (i.e., her/his telephone number, address, email address, etc.) using a key. For clarity, this application will refer to this key as the private key. The private key is computed using a cryptographic hash of the contact's name combined with a salt.

According to an embodiment to this invention, hash functions are used for generating the digest and the private key. Hash functions take as input a string of arbitrary length and return a digest of some fixed length. The cryptographic hash function is chosen such that the probability that any two inputs produce the same output is negligible, and it is infeasible to discover the input of the hash given only the hash's digest. Several such cryptographic functions exist and are commonly used in e-commerce (e.g., secure web browsing).

According to another embodiment, the encrypted contact information and the digest use separate hash functions that produce two separate and independent outputs. A practical and secure way of achieving this is to derive the digest and the key using the Hash-based Message Authentication Code (HMAC). HMAC produces a digest over an input text that is dependent on both the input and a supplied HMAC key (note this is not the same as the private key). For example, digest=HMAC1(salt, contact name) and private key=HMAC2(salt, contact name). It is noted that an HMAC function cannot be reversed. For example, even knowing the private key that is generated by HMAC2(salt, contact name), a person may not reproduce either salt or contact name from the private key.

The method may be implemented as software and/or hardware on a mobile device. When the user of the device enters data concerning a new contact, software/hardware on the device randomly generates a new salt and computes the digest and private key. The contact's contact information is then encrypted using the derived private key, and the record, ([salt, digest, encrypted contact information]), is written to the device's non-volatile (permanent) memory. The private key, the contact name, and the contact information in plain text are then wiped from memory. When the user wishes to access a contact's information, the user inputs the contact's name into the device. (Note that it is not possible to display a list of the contacts in plain text, since the contacts' names in plain text have been irreversibly hashed and wiped from the memory.) Given the user's inputted contact name, the device then examines each record in its database. For each record, the device computes a digest using the record's salt; if the computed digest matches the digest stored in the record, then the device computes the private key (again, using the contact name supplied by the user), decrypts the encrypted contact information, and displays the contact information to the user.

According to an embodiment, the method stores only the hashes of contact names and encrypts contact information using keys that are independent of all other records. Knowledge of one contact's name reveals the contact information for only that contact. That is, recovering one contact does not compromise the others, as each contact is individually secured. Thus, even if an adversary or stranger obtains or guesses one of the contacts, he or she can only get that contact's information.

According to another embodiment, an application of the disclosed invention may provide the ability to securely store contacts on a mobile device without the requirement of a password. The difficulty of enumerating contacts gives an advantage of the method over the conventional methods, and the lack of a password makes the method unsusceptible to known password attacks (for example, brute force attacks against short passwords, etc.). On the other hand, an authorized user who knows the name of the contact can readily access them by entering the name.

According to another embodiment of still more robust protection disclosed below, the method may also be implemented in combination with a password or with any biometric identity identifier. The method may also be implemented with the combination with the second asymmetric information of the mobile device, including the telephone number of the mobile device, the product ID of the mobile device, or a card number of the mobile device. As will be appreciated, the embodiments herewith can be used in combination with other known security measures as well.

The application may not be limited to managing stored information. Other applications of this technology may include the ability to create a search index based on one-way hashing to search over encrypted and ciphered text.

FIG. 1 illustrates an exemplary mobile device according to an embodiment.

The mobile device 100 includes a central processing unit (CPU) 110, an input interface 120, an output interface 130, a plurality of ports 140, a memory section 150, a storage section 160, a communication interface 170, and an accessory function section 180. The CPU 110 implements processing according to instructions sent from the mobile operation system or user input. Processing by the CPU 110 include hashing, encrypting, and random number generating. The input interface 120 may include a touch screen, a microphone, a speaker, a key pad, a few function buttons, and/or a ball. The output interface 130 may include a display, a speaker, and a light indicator. The plurality of ports 140 may include a USB port, a port for charging a battery, a port for an earphone, and/or a port of accepting memory cards. The memory section 150 may include volatile memory for temporarily holding data. The storage section 160 may include non-volatile memory for permanently storing data. The storage section 160 may include a disk, a smart card, or a built-in memory of the mobile device. The communication interface 170 may include a wireless interface, such as WiFi and cellular, for accessing a communication network, an interface for accessing a data network, and an interface for a short range communication such as Bluetooth. The accessory function sections 180 may include an infrared signal generating section, a barcode scanner, a global positioning system, and a multimedia processor. It is, however, within the scope of this invention that some of these components may serve multiple roles of the above stated functions.

The storage section 160 stores information and data, such as contact information, financial information, medical records, and passwords to other accounts. At least part of the stored information and data is asymmetric between a user of the mobile device and a non-user. The user of the mobile device will readily know or can be expected to know the asymmetric information, but a non-user will not, with few exceptions, know or discern the content of the asymmetric information. For example, when contact information is stored, the user of the mobile device may know the contact name, contact number, and address, which would not be known by an unauthorized user (e.g., a thief, a spy, or an enemy). The same is true for medical records or financial information or individualized files. The asymmetric information may be personal, sensitive, confidential, or privileged.

As will be understood, the information and data stored in the storage section 160 may be downloaded by an external apparatus such as a computer. Therefore, the information and data need protection so that even after an attacker downloads the information and data to another device, the information and data may not be accessed by the attacker. The method disclosed herewith secures information even if it is copied from mobile device.

Figure 2:
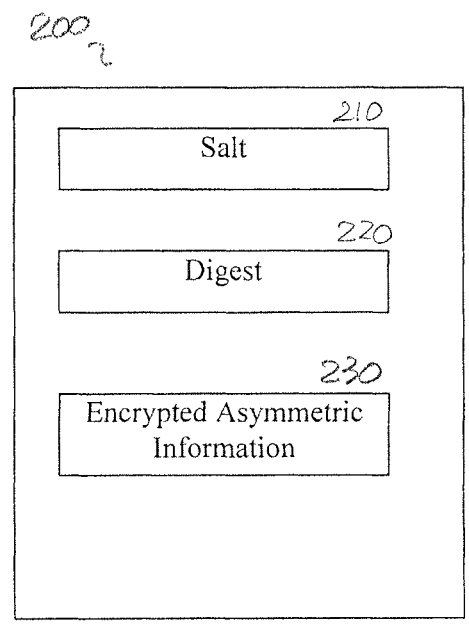
FIG. 2 illustrates a record of information stored in a mobile device according to an embodiment.

FIG. 2 illustrates an exemplary record 200 of information stored in the storage section 160.

The record 200 may include the following field of information: a salt field 210, a digest field 220, and an encrypted field 230 corresponding to encrypted information. The salt field 210 includes one or more salts, each of which represents a randomly generated string. The digest field 220 includes a digest used as an identifier of the record 200. The encrypted field 230 includes encrypted information of the stored information.

A salt may be stored in the salt filed 210 in plaint text or in cipher text. When the salt is stored in plain text, an attacker may obtain the salt without any difficulties. But the attacker still needs to determine the actual usage of the salt. For example, an attacker needs to determine whether the salt is merely an identifier or is an input for an encrypting/decrypting function. When the salt is in cipher text, a decryption is needed to obtain the salt in plain text.

The digest is generated by a hash function that uses at least a predetermined part of the stored information as an input or variable. The predetermined part of the stored information may be represented by the asymmetric information included in the stored information. According to an embodiment, contact name may be used to generate the digest. Other parts of the stored information may also be used, such as social security number, telephone number, nickname, physician name, bank name, or other asymmetric information. The digest generated by the hash function may be shown in a form of random numbers, characters, or symbols that have no semantic meanings when looked at by a person. According to an embodiment, the digest may be generated by using both the predetermined part of the stored information and the salt to enhance the security of the protection. As the salt is randomly generated, an attacker would have to know the salt and its proper usage, the predetermined part of the stored information, and the hash function to generate the correct digest.

The encrypted information is generated by encrypting the information to be stored by a private key. According to an embodiment, the private key is generated by a hash function that uses the same predetermined part of the stored information as an input or variable. According to an embodiment, the private key may be generated by using both the predetermined part of the stored information and the salt to enhance the security of the protection.

According to an embodiment, the hash function to generate the digest may be the same as that used to generate the private key or may be different from that used to generate the private key. The salt used to generate the digest may be the same as that to generate the private key or may be different from that to generate the private key.

By generating the digest using asymmetric information included in the stored information, each record may be identified by a unique identifier without any pattern. An attacker must correctly guess the identifier to access the correct record. By generating the private key using asymmetric information included in the stored information, each record may be encrypted by a unique private key. An attacker must identify the private key for each record to obtain the plain text of it. These protection measures substantially increase the amount of time and resource input by the attacker. As a result, the stored information is better protected by this invention than those protected by conventional methods.

FIGS. 3-8 illustrates embodiments of specific implementation on a mobile device to manage contact information.

Figure 3:
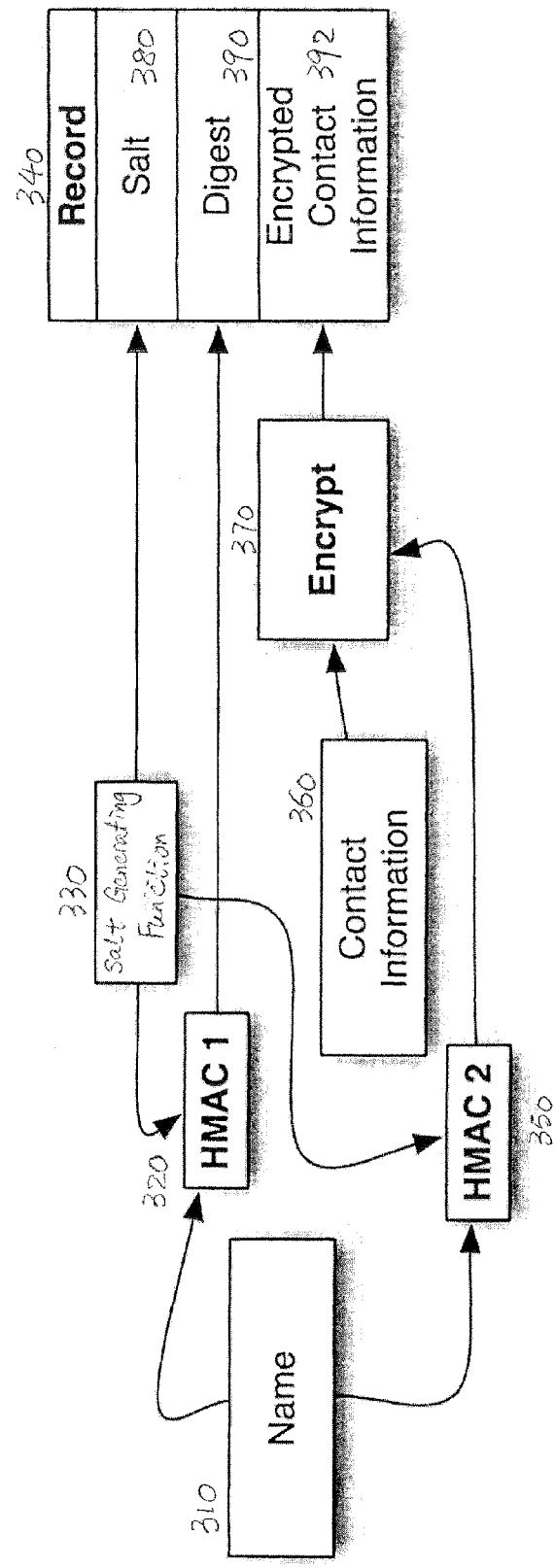
FIG. 3 illustrates an information managing process according to an embodiment.

FIG. 3 illustrates adding and storing a contact to a mobile device with two hash functions and one salt.

The mobile device includes two hash functions: an HMAC1 320 and an HMAC2 350. The mobile device also includes a random string generating function 330 for generating a salt 380. The mobile device also includes an encrypting function 370. When a user inputs a contact 360 using the input interface of the mobile device and instructs the mobile device to add the contact, the mobile device obtains the contact name 310 (both first name and last name) from the contact. The mobile device inputs the contact name 310 and the salt 380 into the first hash function HMAC1 320 to generate a digest 390. The mobile device inputs the contact name 310 and the salt 380 to the second hash function HMAC2 350 to generate a private key. The mobile device uses the encrypting function 370 to encrypt the contact information 360 using the private key and output the encrypted contact information 392. To store the contact information, the mobile device associates the salt 380, the digest 390, and the encrypted contact information 392 together to form a record 340 and stores the record in the mobile device. After storing the record 340, the mobile device deletes all the contact information and salt 380 in plain text that are temporarily held in a memory.

Figure 4:
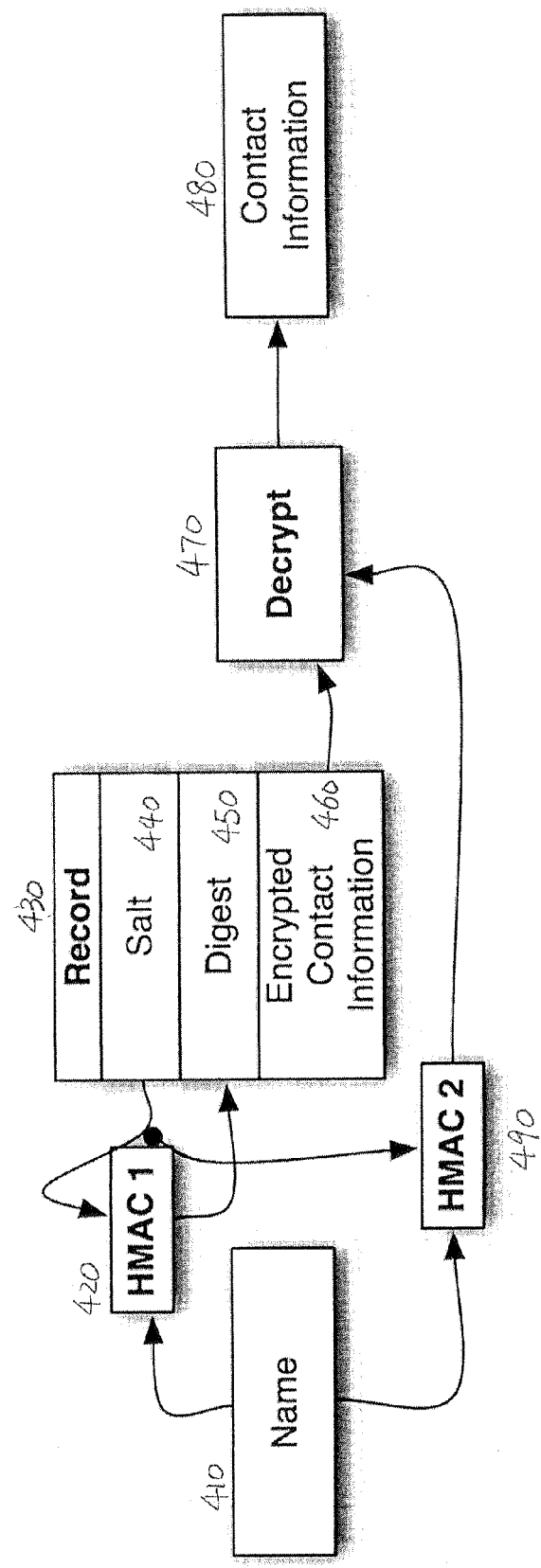
FIG. 4 illustrates another information managing process according to an embodiment.

FIG. 4 illustrates searching and retrieving a contact from a mobile device with two hash functions and one salt.

When a user inputs a contact name 410 using the input interface of the mobile device and instructs the mobile device to retrieve the contact, the mobile device obtains the input contact name 410 (both first name and last name) The mobile device searches the stored record. For each record 430, the mobile device inputs the contact name 410 and a salt 440 in the record 430 into the first hash function HMAC1 420 to generate a test digest (not shown) and compares the test digest with the digest 450 associated with the record 430. If the test digest does not match the digest 450, the mobile device determines that the record 430 is not the one that is requested by the user and goes to the next record. If the test digest matches the digest 450, the mobile device determines that the record 430 corresponds to the contact name 410 input by the user. Upon finding a match, the mobile device inputs the input contact name 410 and the salt 440 to the second hash function HMAC2 490 to generate a private key. After that, the mobile device uses the decrypting function 470 to decrypt the encrypted contact information 460 using the private key and displays the decrypted contact information 480 to a user. If more than one record is found to match with the user's contact name, all of the records are decrypted and displayed to the user.

Figure 5:
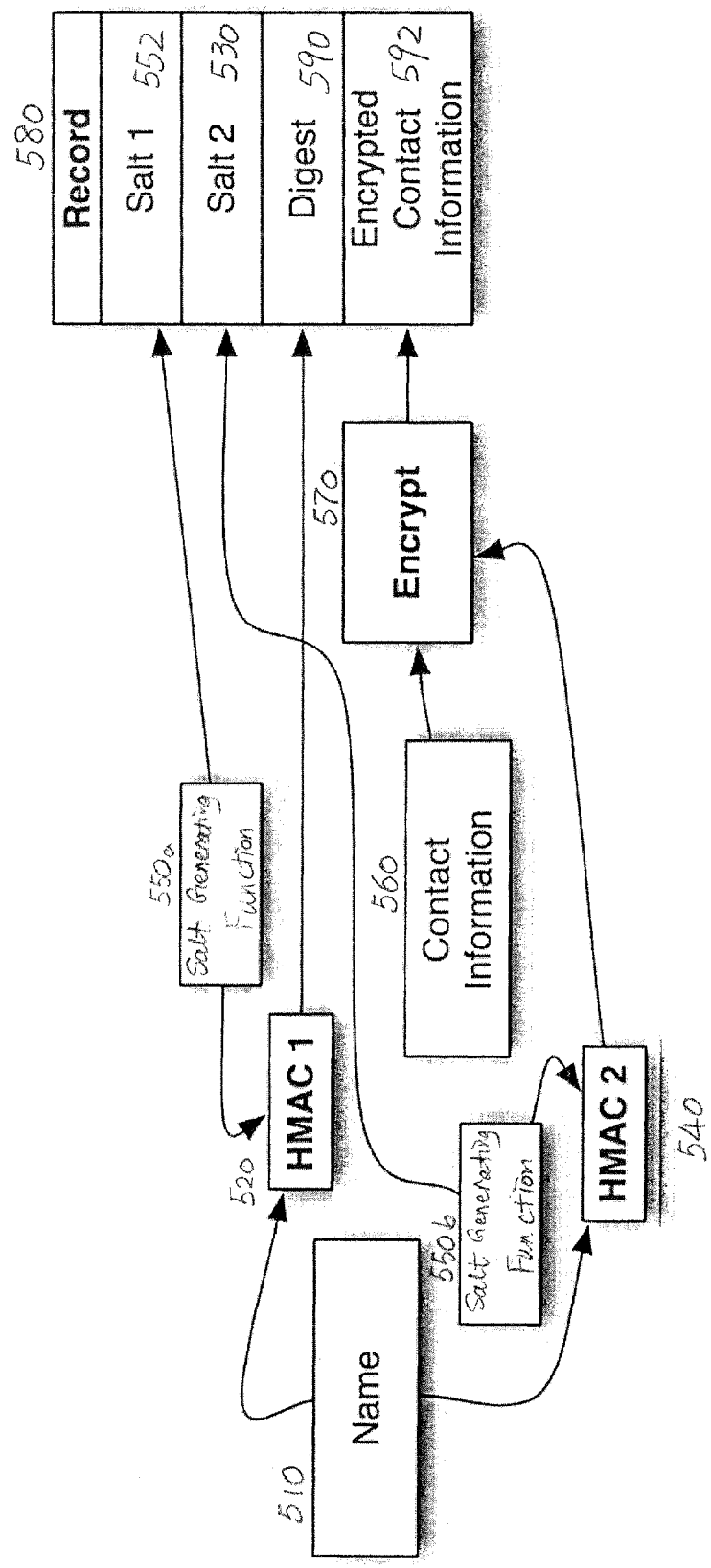
FIG. 5 illustrates another information managing process according to an embodiment.

FIG. 5 illustrates adding and storing a contact to a mobile device with two hash functions and two salts.

The mobile device includes two hash functions: an HMAC1 520 and an HMAC2 540. The mobile device also includes random string generating functions 550a and 550b for generating two salts: a first salt 552 and a second salt 530. The mobile device also includes an encrypting function 570. When a user inputs a contact 560 using the input interface of the mobile device and instructs the mobile device to add the contact, the mobile device obtains the contact name 510 (both first name and last name) from the contact. The mobile device inputs the contact name 510 and the first salt 552 into the first hash function HMAC1 520 to generate a digest 590. The mobile device inputs the contact name 510 and the second salt 530 to the second hash function HMAC2 540 to generate a private key. The mobile device uses the encrypting function 570 to encrypt the contact information 560 using the private key and output the encrypted contact information 592. To store the contact information, the mobile device associates the first salt 552, the second salt 530, the digest 590, and the encrypted contact information 592 together to form a record 580 and stores the record 580 in the mobile device. After storing the record, the mobile device deletes all the contact information, the first salt 552, and the second salt 530 in plain text that are temporarily held in a memory.

Figure 6:
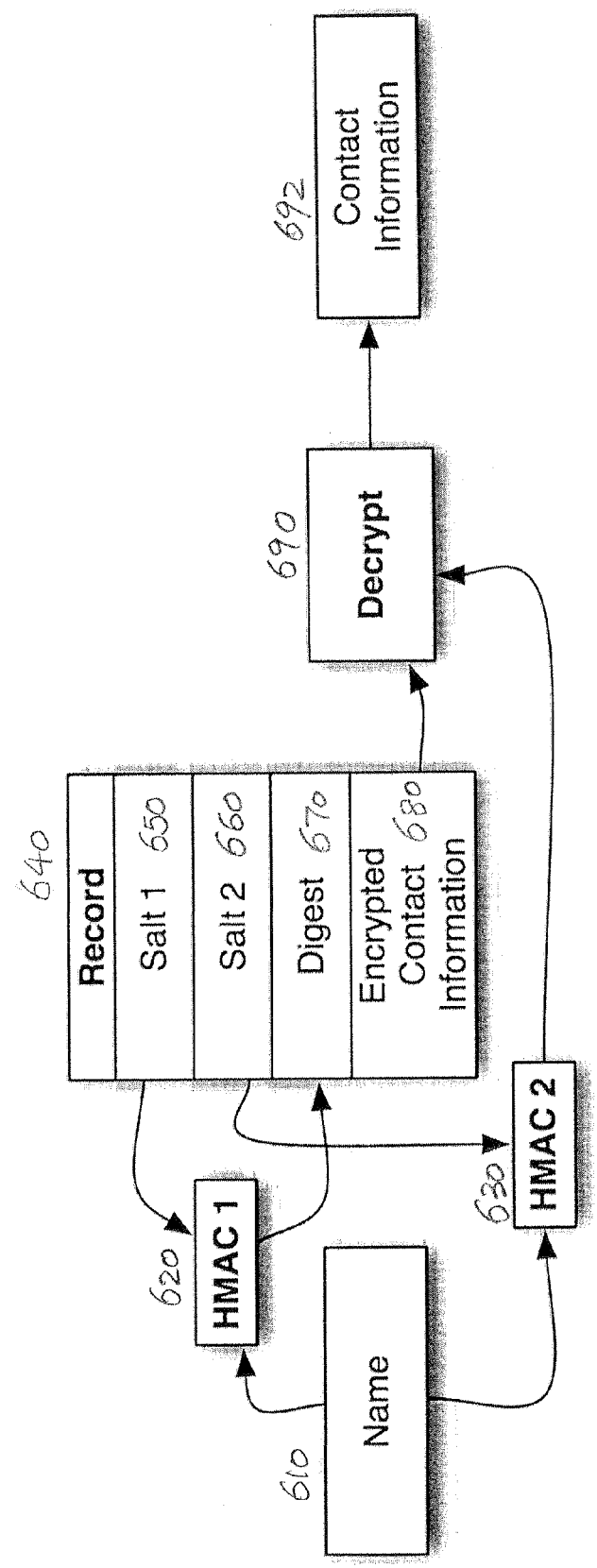
FIG. 6 illustrates another information managing process according to an embodiment.

FIG. 6 illustrates searching and retrieving a contact from a mobile device with two hash functions and two salts.

When a user inputs a contact name 610 using the input interface of the mobile device and instructs the mobile device to retrieve the contact, the mobile device obtains the input contact name 610 (both first name and last name). The mobile device searches all the stored records. The mobile device inputs the contact name 610 and a first salt 650 of a record 640 into the first hash function HMAC1 620 to generate a test digest (not shown) and compares the test digest with the digest 670 associated with the record 640. If the test digest does not match the digest 670, the mobile device determines that the record 640 is not the one that is requested by the user and goes to the next record. If the test digest matches the digest 670, the mobile device determines that the record 640 corresponds to the contact name 610 input by the user. Upon finding a match, the mobile device inputs the input contact name 610 and the second salt 660 to the second hash function HMAC2 630 to generate a private key. After that, the mobile device uses the decrypting function 690 to decrypt the encrypted contact information 680 using the private key and displays the decrypted contact information 692 to a user. If more than one record is found to match with the user's contact name, all of the records are decrypted and displayed to the user.

Figure 7:
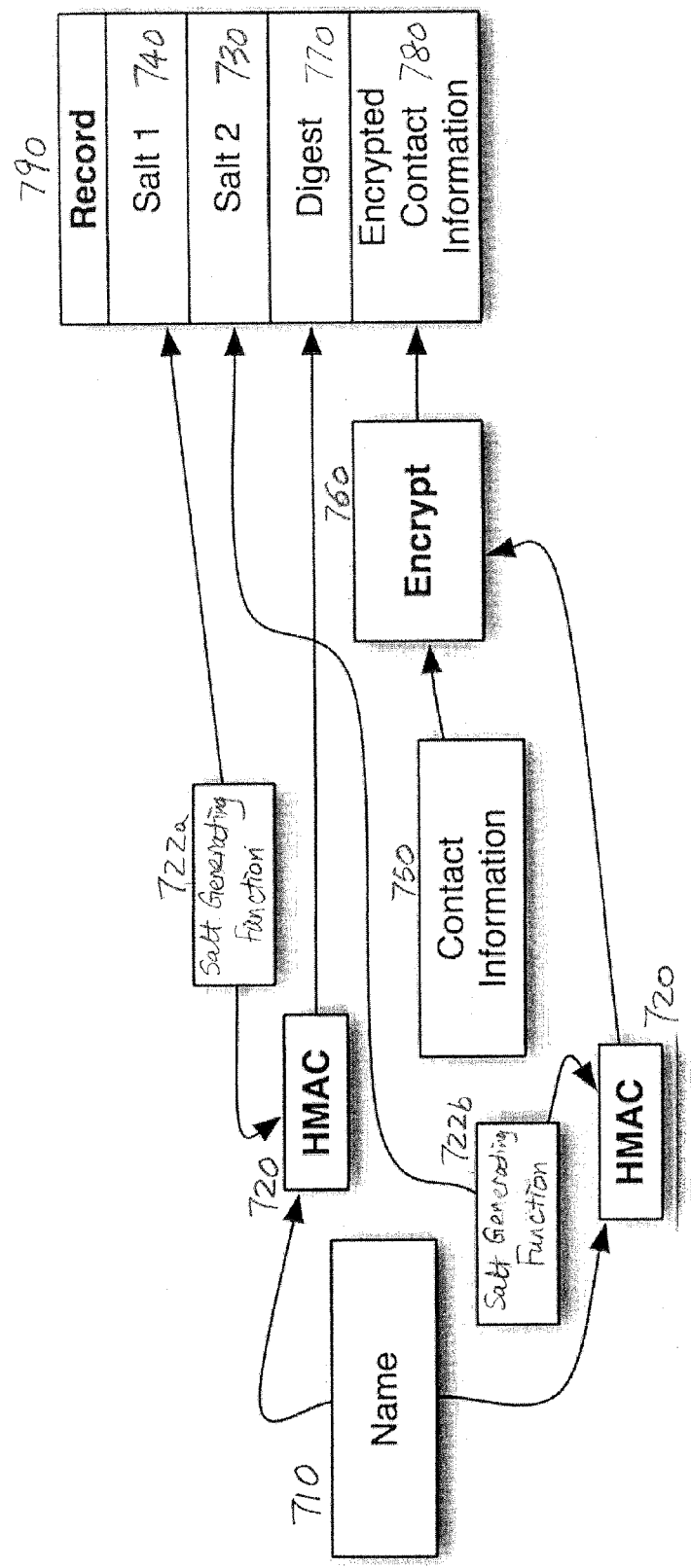
FIG. 7 illustrates another information managing process according to an embodiment.

FIG. 7 illustrates adding and storing a contact to a mobile device with one hash function and two salts.

The mobile device includes one hash function HMAC 720. The mobile device also includes random string generation functions 722a and 722b for generating two salts: a first salt 740 and a second salt 730. The mobile device also includes an encrypting function 760. When a user inputs a contact 750 using the input interface of the mobile device and instructs the mobile device to add the contact, the mobile device obtains the contact name 710 (both first name and last name) from the contact 750. The mobile device inputs the contact name 710 and the first salt 740 into the hash function HMAC 720 to generate a digest 770. The mobile device inputs the contact name 710 and the second salt 730 to the same hash function 720 to generate a private key. The mobile device uses the encrypting function 760 to encrypt the contact information 750 using the private key and output the encrypted contact information 780. To store the contact information, the mobile device associates the first salt 740, the second salt 730, the digest 770, and the encrypted contact information 780 together to form a record 790 and stores the record 790 in the mobile device. After storing the record, the mobile device deletes all the contact information: the first salt 740 and the second salt 730 in plain text that are temporarily held in a memory.

Figure 8:
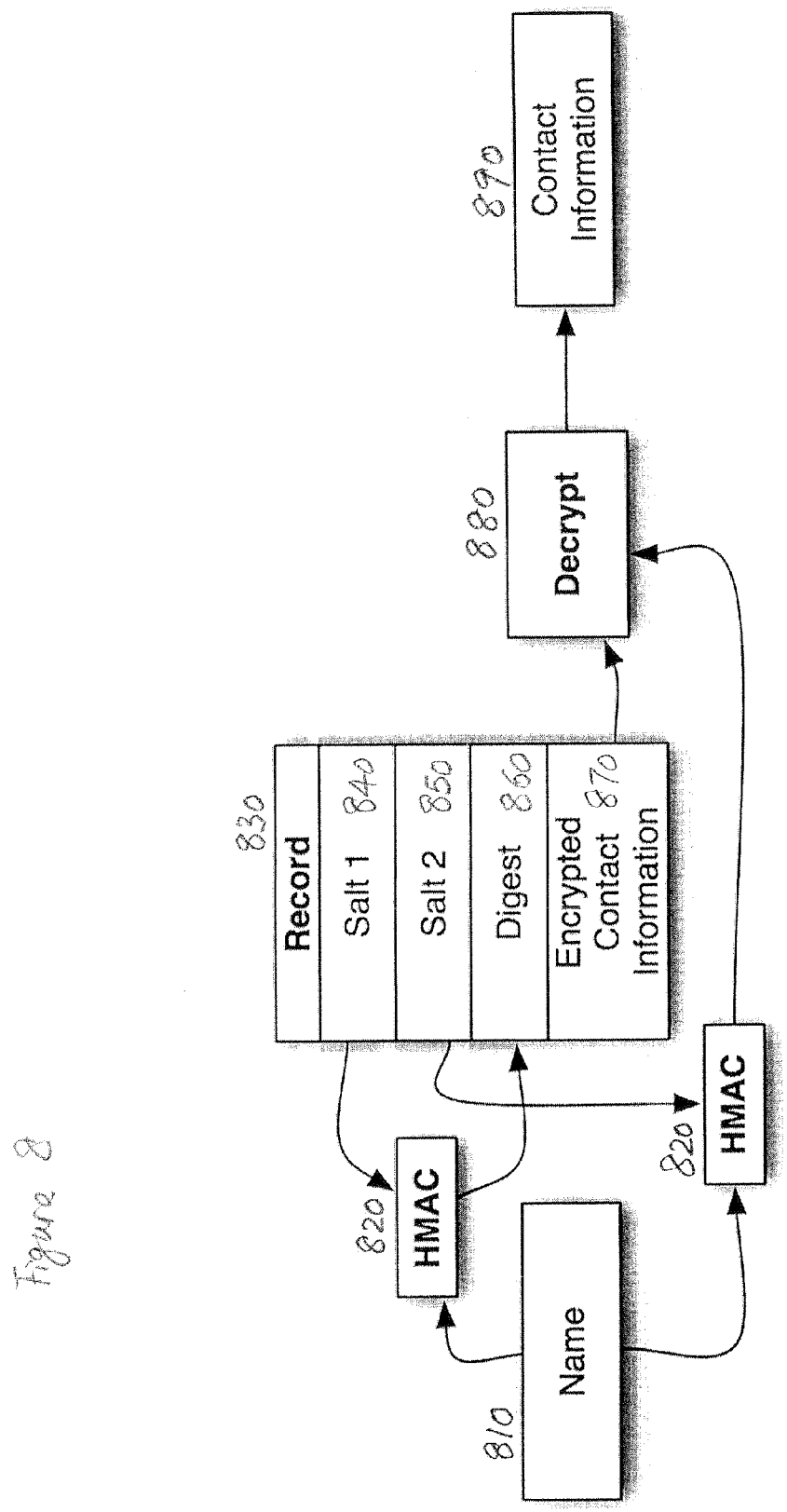
FIG. 8 illustrates another information managing process according to an embodiment.

FIG. 8 illustrates searching and retrieving a contact from a mobile device with one hash function and two salts.

When a user inputs a contact name 810 using the input interface of the mobile device and instructs the mobile device to retrieve the contact, the mobile device obtains the input contact name 810 (both first name and last name). The mobile device searches all the stored records. The mobile device inputs the contact name and a first salt 840 of a record 830 into the hash function 820 to generate a test digest (not shown) and compares the test digest with the digest 860 associated with the record 830. If the test digest does not match the digest 860, the mobile device determines that the record 830 is not the one that is requested by the user and goes to the next record. If the test digest matches the digest 860, the mobile device determines that the record 830 corresponds to the contact name 810 input by the user. Upon finding a match, the mobile device inputs the input contact name 810 and the second salt 850 to the same hash function HMAC 820 to generate a private key. After that, the mobile device uses the decrypting function 880 to decrypt the encrypted contact information 870 using the private key and displays the decrypted contact information 890 to a user. If more than one record is found to match with the user's contact name, all of the records are decrypted and displayed to the user.

In the above-examples, both the first name and last name are used for adding and retrieving a record. According to another embodiment, a user is allowed to use a first name, a last name, a nickname, an alias, or any other identifier that is preferred by the user to assist the user to better memorize the contact. Similarly, embodiments for other sensitive files (e.g. medical records, calendar files for private appointments, or sensitive or confidential documents) may prompt the user to enter an asymmetric name for a file so that the asymmetric name is easily remembered but not easily guessed.

In general, when a mobile device includes a plurality of contacts, each of the contact may be encrypted or decrypted separately from other contacts by using a unique encryption key generated according to embodiments. In this way, each record includes a unique digest; and each contact is encrypted or decrypted with a unique key.

Figure 9:
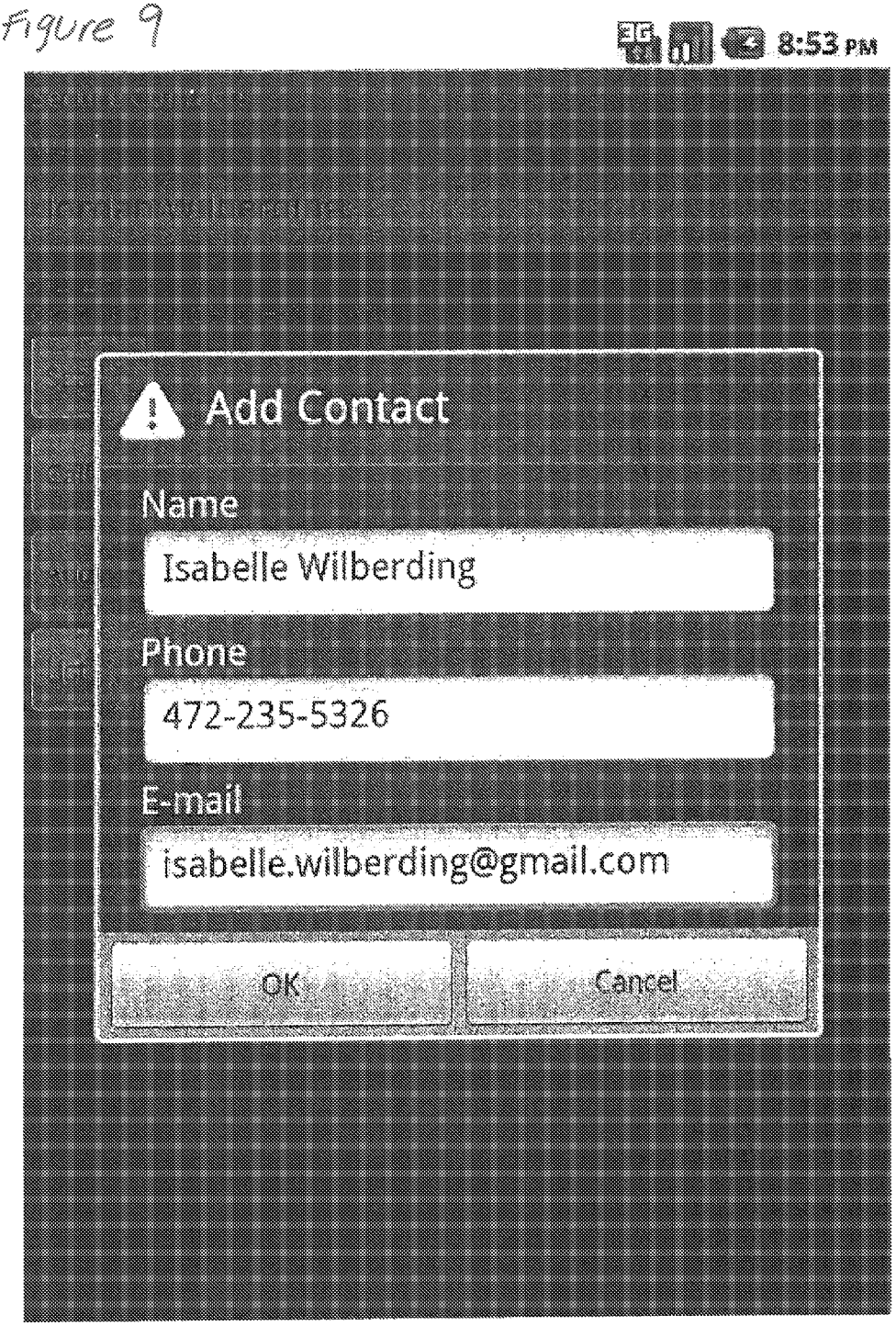
FIG. 9 illustrates an exemplary screen shot for adding information according to an embodiment.

FIG. 9 illustrates a screen shot when a user adds a contact according to an embodiment.

When a user adds a contact into a contact list stored on a mobile phone, the mobile phone provides a graphical user interface (GUI) that allows the user to input contact information such as name, phone, and E-mail. During the input, the mobile phone displays the user's input in plain text. According to an embodiment, both the first name and the last name of a contact are required to enhance the security because it is more difficult for an attacker to guess both first and last names correctly than to guess just either first or last names. According to another embodiment, a user is allowed to use nickname, an alias, or any other identifier that is preferred by the user to assist the user to better memorize the contact. When the user finishes the input and clicks the "OK" button, the mobile device adds and stores the input by the user according to the methods.

As will be understood, information can be entered into a device any number of ways. For example, according to an embodiment, voice recognition software receives a user's voice via a receiver as input. A user may speak into a microphone of the mobile device, which creates a transcript based on the user's voice. Text corresponding to contacts, names or other desired information can be extracted from the transcript and displayed on the GUI for confirmation and input.

Figure 10:
FIG. 10 illustrates an exemplary screen shot for retrieving information according to an embodiment.

FIG. 10 illustrates a screen shot when a user intends to search for a contact according to an embodiment. The mobile device provides a GUI to the user for searching a contact. The GUI does not voluntarily display a list of contacts for the user to select. Instead, the GUI requires the user to input the name of a contact. The GUI may show a general non-descript representation of encrypted contacts to remind the user that this GUI is for searching a contact but does not identify the contact. The general representation of encrypted contacts may include a first line, "XXX-XXX-XXXX", indicating a telephone number and a second line, XXXXX@XXXXX.XXX, indicating an email address. To find the contact, the user needs to input the correct name of the contact (e.g. "Jordan Wilberbing") and then click a "Search" button in the GUI. In one embodiment, the device is configured to allow the user, if he or she has confidence that the contact name is correct, to click the call button so that the mobile device will find the contact, decrypt the information, and call the contact using a telephone number included in a contact.

FIG. 11 illustrates a screen shot, in accordance with an embodiment, when a full list of contacts on the mobile device is displayed without decryption. When a user clicks a "List All" button shown in FIG. 10, a list of stored contacts is displayed to the user in its encrypted form, as shown in FIG. 11. The user, no matter the person who creates the contact list or an attacker, can not discern any meaning from the encrypted list.

According to another embodiment, the "List All" button may allow a user to input multiple names, decrypt records associated with the multiple names, and display them together to the user.

According to another embodiment, other functions may be used in combination with HMAC, including SHA series and MD series. Examples of functions included in SHA series include SHA-1, SHA-256, and SHA-512. Examples of functions included in MD series include MD4 and MD5.

A person of ordinary skills in the art would recognize that the mobile device, as described in the specification, may include a plurality of portable devices, ranging from smartphones to laptop computers, tablets, and e-readers. Exemplary products may include iPhone, Blackberry, Palm, Android, ThunderBolt, iPad, Macbook, Kindle, Nook, and Netbooks.

According to another embodiment, the information managing method may be implemented on a computer or other electronic devices to manage personal or sensitive information stored thereon using asymmetric information. Computers that store personal or sensitive information include an email server, a server storing social security, credit card, and bank account, a law firm's storage medium, and a personal computer storing identification information. Other electronic devices may include a copy machine, a fax machine, a scanner, an IC card, or a camera.

It will be appreciated from the above that the invention may be implemented as computer software, which may be supplied on a storage medium or via a transmission medium such as a local-area network or a wide-area network, such as the Internet. It is to be further understood that, because some of the constituent system components and method steps depicted in the accompanying Figures can be implemented in software, the actual connections between the systems components (or the process steps) may differ depending upon the manner in which the present invention is programmed. Given the teachings provided herein, one of ordinary skill in the related art will be able to contemplate these and similar implementations or configurations.

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit. Although illustrative embodiments have been described in detail herein with reference to the accompanying drawings, it is to be understood that the invention is not limited to those precise embodiments, and that various changes and modifications can be effected therein by one skilled in the art without departing from the scope and spirit as defined by the appended claims.

What is claimed is:

1. A method for protecting information on a mobile device, comprising:
   obtaining a predetermined portion of asymmetric information upon an input of the asymmetric information in the mobile device;
   generating an identifier by using a first generating algorithm that uses the predetermined portion of the asymmetric information as an algorithm input;
   generating a first salt that is used as an algorithm input by the first generating algorithm and the second generating algorithm;
   generating an encryption key by using a second generating algorithm different from the first generating algorithm that uses the predetermined portion of the asymmetric information as an algorithm input;
   generating ciphered information by using an encryption algorithm that uses the encryption key and the information as algorithm inputs;
   associating the identifier with the ciphered information; and
   storing the ciphered information as associated with the identifier,
   wherein the asymmetric information comprises asymmetric information selected from contact information, a file name, a telephone number, a product ID of the mobile device, a card number of the mobile device; an identification number, a name, or asymmetric data associated with a file, and
   the predetermined portion includes the asymmetric information.

2. The method according to claim 1, further comprising:
   generating a first salt and a second salt, wherein the first salt and the second salt are different.

3. The method according to claim 2, comprising:
   the first generating algorithm using the first salt as an algorithm input, and
   the second generating algorithm using the second salt as an algorithm input,
   wherein the first algorithm and the second algorithm are identical.

4. The method according to claim 2, comprising:
   the first generating algorithm using the first salt as an algorithm input, and
   the second generating algorithm using the second salt as an algorithm input,
   wherein the first algorithm and the second algorithm are different.

5. The method according to claim 1, wherein when a plurality of pieces of information are inputted into the mobile device, each piece of the input information is individually encrypted by using asymmetric information associated with that piece of the input information.

6. The method according to claim 1, further comprising:
   retrieving information from the mobile device.

7. The method according to claim 6, comprising:
   prompting a user to input retrieving information;
   generating search information by using the first generating algorithm; and
   determining whether the search information matches any identifier stored in the mobile device.

8. The method according to claim 1, the method comprising:
   matching the search information to the identifier stored in the mobile device, and
   generating a decryption key by using the second generating algorithm and decrypting information associated with the identifier by using the decryption key.

9. The method according to claim 8, wherein when the first generating algorithm and the second generating algorithm are identical, the method further comprises:
   the first generating algorithm including a first salt as an algorithm input, and
   the second generating algorithm including a second salt as an algorithm input,
   wherein the first salt and the second salt are different.

10. The method according to claim 8, wherein when the first generating algorithm and the second generating algorithm are different, the method comprises:
    the first generating algorithm and the second generating algorithm including a same salt as an algorithm input.

11. A non-transitory storage medium recorded thereon a program that, when executed, causes a processor to execute a method for protecting information, the method comprising the steps of:
    obtaining a predetermined portion of asymmetric information upon an input of the asymmetric information in the mobile device;
    generating an identifier by using a first generating algorithm that uses the predetermined portion of the asymmetric information as an algorithm input;
    generating a first salt that is used as an algorithm input by the first generating algorithm and the second generating algorithm;
    generating an encryption key by using a second generating algorithm different from the first generating algorithm that uses the predetermined portion of the asymmetric information as an algorithm input;
    generating ciphered information by using an encryption algorithm that uses the encryption key and the information as algorithm inputs;
    associating the identifier with the ciphered information; and
    storing the ciphered information as associated with the identifier
    wherein the asymmetric information comprises asymmetric data associated with a file and
    wherein the asymmetric information comprises asymmetric information selected from contact information, a file name, a telephone number, a product ID of the mobile device, a card number of the mobile device; an identification number, a name, or asymmetric data associated with a file, and
    the predetermined portion includes the asymmetric information.

12. A mobile device that implements an information protecting method, the information protecting method including:
    obtaining a predetermined portion of asymmetric information upon an input of the asymmetric information in the mobile device;

generating an identifier by using a first generating algorithm that uses the predetermined portion of the asymmetric information as an algorithm input;

generating a first salt that is used as an algorithm input by the first generating algorithm and the second generating algorithm;

generating an encryption key by using a second generating algorithm different from the first generating algorithm that uses the predetermined portion of the asymmetric information as an algorithm input;

generating ciphered information by using an encryption algorithm that uses the encryption key and the information as algorithm inputs;

associating the identifier with the ciphered information; and storing the ciphered information as associated with the identifier;

wherein the asymmetric information comprises asymmetric information asymmetric data associated with a file, and wherein the asymmetric information comprises asymmetric information selected from contact information, a file name, a telephone number, a product ID of the mobile device, a card number of the mobile device; an identification number, a name, or asymmetric data associated with a file, and the predetermined portion includes the asymmetric information.

13. A system that implements an information protecting method, the information protecting method including:

obtaining a predetermined portion of asymmetric information upon an input of the asymmetric information in the mobile device;

generating an identifier by using a first generating algorithm that uses the predetermined portion of the asymmetric information as an algorithm input;

generating a first salt that is used as an algorithm input by the first generating algorithm and the second generating algorithm;

generating an encryption key by using a second generating algorithm different from the first generating algorithm that uses the predetermined portion of the asymmetric information as an algorithm input;

generating ciphered information by using an encryption algorithm that uses the encryption key and the information as algorithm inputs;

associating the identifier with the ciphered information; and storing the ciphered information as associated with the identifier wherein the asymmetric information comprises asymmetric information asymmetric data associated with a file, and wherein the asymmetric information comprises asymmetric information selected from contact information, a file name, a telephone number, a product ID of the mobile device, a card number of the mobile device; an identification number, a name, or asymmetric data associated with a file, and the predetermined portion includes the asymmetric information.

* * * * *